(12) United States Patent
Jiang et al.

(10) Patent No.: US 8,260,378 B2
(45) Date of Patent: *Sep. 4, 2012

(54) MOBILE PHONE

(75) Inventors: Kai-Li Jiang, Beijing (CN); Qun-Qing Li, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 454 days.

This patent is subject to a terminal disclaimer.

(21) Appl. No.: 12/583,158

(22) Filed: Aug. 13, 2009

(65) Prior Publication Data

US 2010/0048254 A1    Feb. 25, 2010

(30) Foreign Application Priority Data

Aug. 22, 2008   (CN) .......................... 2008 1 0142021

(51) Int. Cl.
*H04M 1/00* (2006.01)

(52) U.S. Cl. .................. 455/575.1; 455/566; 455/50

(58) Field of Classification Search .................. 455/566, 455/50, 575.1; 345/211, 90, 173, 174
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 6,957,993 B2 * | 10/2005 | Jiang et al. | 445/50 |
| 7,054,064 B2 | 5/2006 | Jiang et al. | |
| 7,060,241 B2 | 6/2006 | Glatkowski | |
| 7,071,927 B2 | 7/2006 | Blanchard | |
| 7,084,933 B2 | 8/2006 | Oh et al. | |

(Continued)

FOREIGN PATENT DOCUMENTS

CN    2539375    3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510,Aug. 31, 2003,32(8)(lines from the 4th line to 35th line in the right column of p. 507 may be relevant).

(Continued)

*Primary Examiner* — Matthew Anderson
*Assistant Examiner* — Ganiyu A Hanidu
(74) *Attorney, Agent, or Firm* — Altis Law Group, Inc.

(57) ABSTRACT

A mobile phone includes a body defining a display panel, and a touch panel. The body further includes a communicating system received therein. The touch panel is disposed on a surface of the display panel. The touch panel includes at least a carbon nanotube layer. The carbon nanotube layer includes a carbon nanotube film.

20 Claims, 9 Drawing Sheets

U.S. PATENT DOCUMENTS

| | | | |
|---|---|---|---|
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,355,592 B2 | 4/2008 | Hong et al. | |
| 7,532,182 B2 | 5/2009 | Tseng et al. | |
| 7,593,004 B2 | 9/2009 | Spath et al. | |
| 7,630,040 B2 | 12/2009 | Liu et al. | |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,744,793 B2 * | 6/2010 | Lemaire et al. | 264/172.19 |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2 | 5/2011 | Jiang et al. | |
| 2002/0089492 A1 | 7/2002 | Ahn et al. | |
| 2003/0122800 A1 | 7/2003 | Yu | |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kavase et al. | |
| 2005/0209392 A1 | 9/2005 | Luo et al. | |
| 2006/0010996 A1 | 1/2006 | Jordan et al. | |
| 2006/0022221 A1 | 2/2006 | Furukawa et al. | |
| 2006/0044284 A1 | 3/2006 | Tanabe | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 | 12/2006 | Spath et al. | |
| 2006/0274049 A1 | 12/2006 | Spath et al. | |
| 2006/0275956 A1 | 12/2006 | Konesky | |
| 2006/0278444 A1 | 12/2006 | Binstead | |
| 2007/0065651 A1 | 3/2007 | Glatkowski et al. | |
| 2007/0075619 A1 | 4/2007 | Jiang et al. | |
| 2007/0081681 A1 | 4/2007 | Yu et al. | |
| 2007/0085838 A1 | 4/2007 | Ricks et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0007535 A1 | 1/2008 | Li | |
| 2008/0029292 A1 * | 2/2008 | Takayama et al. | 174/126.4 |
| 2008/0048996 A1 | 2/2008 | Hu et al. | |
| 2008/0088219 A1 | 4/2008 | Yoon et al. | |
| 2008/0095694 A1 | 4/2008 | Nakayama et al. | |
| 2008/0129666 A1 | 6/2008 | Shimotono et al. | |
| 2008/0138589 A1 | 6/2008 | Wakabayashi et al. | |
| 2008/0170982 A1 | 7/2008 | Zhang et al. | |
| 2008/0192014 A1 | 8/2008 | Kent et al. | |
| 2008/0238882 A1 | 10/2008 | Sivarajan et al. | |
| 2008/0248235 A1 | 10/2008 | Feng et al. | |
| 2008/0266273 A1 * | 10/2008 | Slobodin et al. | 345/174 |
| 2008/0299031 A1 | 12/2008 | Liu et al. | |
| 2008/0316182 A1 * | 12/2008 | Antila et al. | 345/173 |
| 2009/0002590 A1 * | 1/2009 | Kimura | 349/43 |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0153513 A1 | 6/2009 | Liu et al. | |
| 2009/0153516 A1 | 6/2009 | Liu et al. | |
| 2009/0167709 A1 | 7/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2009/0295738 A1 * | 12/2009 | Chiang | 345/173 |
| 2010/0001972 A1 | 1/2010 | Jiang et al. | |
| 2010/0001975 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 2706973 | 6/2005 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| CN | 101239712 | 8/2008 |
| CN | 101248411 | 8/2008 |
| DE | 202007006407 | 9/2007 |
| EP | 1739692 | 1/2007 |
| JP | S61-231626 | 10/1986 |
| JP | S62-63332 | 3/1987 |
| JP | 62-139028 | 6/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-238090 | 2/1994 |
| JP | H6-67788 | 3/1994 |
| JP | 1995-28598 | 1/1995 |
| JP | 8-287775 | 11/1996 |
| JP | H10-63404 | 3/1998 |
| JP | 2001-34419 | 2/2001 |

| | | |
|---|---|---|
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2006-330883 | 12/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | I233570 | 6/2005 |
| TW | 200518195 | 6/2005 |
| TW | I234676 | 6/2005 |
| TW | 200522366 | 7/2005 |
| TW | 284963 | 1/2006 |
| TW | 1249134 | 2/2006 |
| TW | 1249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.

K. Noda et al. Production of Transparent Conductive Films with Inserted SiO2 Anchor Layer, and Application to a Resistive Touch Panel, Electronics and Communications, Jul. 2001, pp. 39-45, vol. 84, Japan.

Susuki et al."Investigation of physical and electric properties of silver pastes as binder for thermoelectric materials". Review of Scientific Instruments,76,(2005);pp. 023907-1-023907-5.

Fan et al. "Self-Oriented Regular Arrays of Carbon Nanotubes and Their Field Emission Properties". Science, vol. 283, (1999);pp. 512-514.

Wu et al."Transparent, Conductive Carbon Nanotube Films". Science,vol. 305,(2004);pp. 1273-1276.

ASM Handbook."vol. 2 Properties and Selection: Nonferrous Alloys and Special-Purpose Materials".Apr. 2007; pp. 840-853.

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

George Gruner, "Carbon Nanonets Spark New Electronics", Scientific American, pp. 76-83, May, 2007.

Ri Kurosawa, "Technology Trends of Capacitive Touch Panel", Technology and Development of Touch Panel, AMC, First Impression, pp. 54-64, Dec. 27, 2004(the 6th paragraph on p. 55 may be relevant).

Mei Zhang etal., "Strong Transparent, Multifunctional, Carbon Nanotube Sheets", Science, America, AAAS, vol. 309, pp. 1215-1219, Aug. 19, 2005.

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

R Colin Johnson, "Carbon nanotubes aim for cheap, durable touch screens",2007.08 http://psroc.phys.ntu.edu.tw/bimonth/v27/615.pdf.

Xianglin Liu, "strong, transparent, multifunctional carbon nanotube sheets", pp. 720-721, 2005.10 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

* cited by examiner

MOBILE PHONE

RELATED APPLICATIONS

This application is related to application Ser. No. 12/286, 145, filed Sep. 29, 2008, titled, "TOUCH PANEL AND DISPLAY DEVICE USING THE SAME," application Ser. No. 12/286,216, filed Sep. 29, 2008, titled, "TOUCH PANEL AND DISPLAY DEVICE USING THE SAME," application Ser. No. 12/286,152, filed Sep. 29, 2008, titled, "TOUCH PANEL, METHOD FOR MAKING THE SAME AND DISPLAY DEVICE USING THE SAME", application Ser. No. 12/384,328, filed Apr. 2, 2009, titled, "PERSONAL DIGITAL ASSISTANT," application Ser. No. 12/286,151, filed Sep. 29, 2008, titled, "TOUCH PANEL, METHOD FOR MAKING THE SAME AND DISPLAY DEVICE USING THE SAME," application Ser. No. 12/286,160, filed Sep. 29, 2008, titled, "TOUCH PANEL AND DISPLAY DEVICE USING THE SAME," application Ser. No. 12/286,146, filed Sep. 29, 2008, titled, "TOUCH PANEL AND DISPLAY DEVICE USING THE SAME," application Ser. No. 12/286, 181, filed Sep. 29, 2008, titled, "TOUCH PANEL AND DISPLAY DEVICE USING THE SAME," application Ser. No. 12/286,176, filed Sep. 29, 2008, titled, "TOUCH PANEL AND DISPLAY DEVICE USING THE SAME," application Ser. No. 12/286,219, filed Sep. 29, 2008, titled, "TOUCH PANEL, METHOD FOR MAKING THE SAME AND DISPLAY DEVICE USING THE SAME," application Ser. No. 12/286,189, filed Sep. 29, 2008, titled, "TOUCH PANEL AND DISPLAY DEVICE USING THE SAME," application Ser. No. 12/286,179, filed Sep. 29, 2008, titled, "TOUCH PANEL AND DISPLAY DEVICE USING THE SAME," application Ser. No. 12/286,220, filed Sep. 29, 2008, titled, "TOUCH PANEL AND DISPLAY DEVICE USING THE SAME," application Ser. No. 12/286,227, filed Sep. 29, 2008, titled, "TOUCH PANEL AND DISPLAY DEVICE USING THE SAME," application Ser. No. 12/286,166, filed Sep. 29, 2008, titled, "TOUCH PANEL AND DISPLAY DEVICE USING THE SAME," application Ser. No. 12/286,178, filed Sep. 29, 2008, titled, "TOUCH PANEL AND DISPLAY DEVICE USING THE SAME," application Ser. No. 12/286, 228, filed Sep. 29, 2008, titled, "TOUCH PANEL, METHOD FOR MAKING THE SAME AND DISPLAY DEVICE USING THE SAME," application Ser. No. 12/286,144, filed Sep. 29, 2008, titled, "TOUCH PANEL AND DISPLAY DEVICE USING THE SAME," "TOUCH PANEL AND COMPUTER USING THE SAME", filed currently Ser. No. 12/459,557"; "PORTABLE COMPUTER", filed currently Ser. No. 12/459,544". The co-pending applications have the same assignee as the present application.

BACKGROUND

1. Technical Field

The present disclosure relates to mobile phones, and, in particular, to a mobile phone employed with a touch panel based on carbon nanotubes.

2. Description of the Related Art

Conventionally, mobile phones include a body, a display panel disposed on a surface of the body, and an input device, such as a keyboard mounted on the surface of the body. Following the development of various electronic apparatuses in recent years, a touch panel has been widely applied to the display panel of the mobile phones.

At present, different types of touch panels have been developed, including a resistance-type, a capacitance-type, an infrared-type, and a surface sound wave-type. The resistance-type and capacitance-type touch panels have been widely used in mobile phones because of higher accuracy and resolution.

A typical capacitance-type touch panel includes a glass substrate, a transparent conductive layer, and four electrodes. It is well known that a layer of an indium tin oxide (ITO) is adopted to function as the transparent conductive layer. However, the ITO layer of the touch panel has poor mechanical durability, low chemical endurance, and uneven resistance over the entire area of the touch panel. Furthermore, the ITO layer has relatively low transparency in humid environments. All the above-mentioned problems of the ITO layer tend to yield a touch panel with relatively low sensitivity, accuracy, and brightness. Moreover, the ITO layer is generally formed by means of ion-beam sputtering, a relatively complicated method.

What is needed, therefore, is a mobile phone having an improved touch panel that can overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
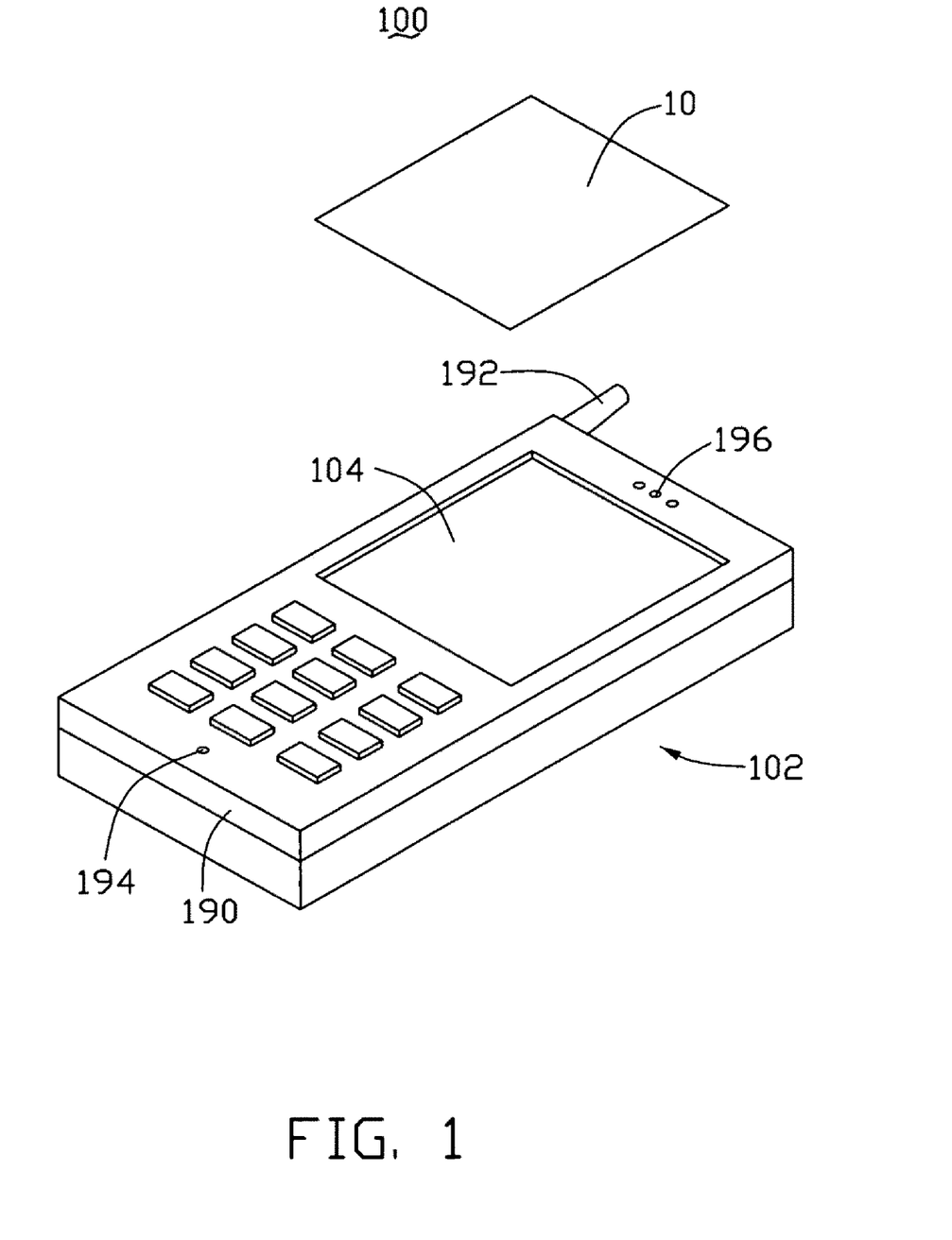
FIG. 1 is a schematic, partially exploded view of a first embodiment of a mobile phone having one embodiment of a resistive touch panel.
Figure 2:
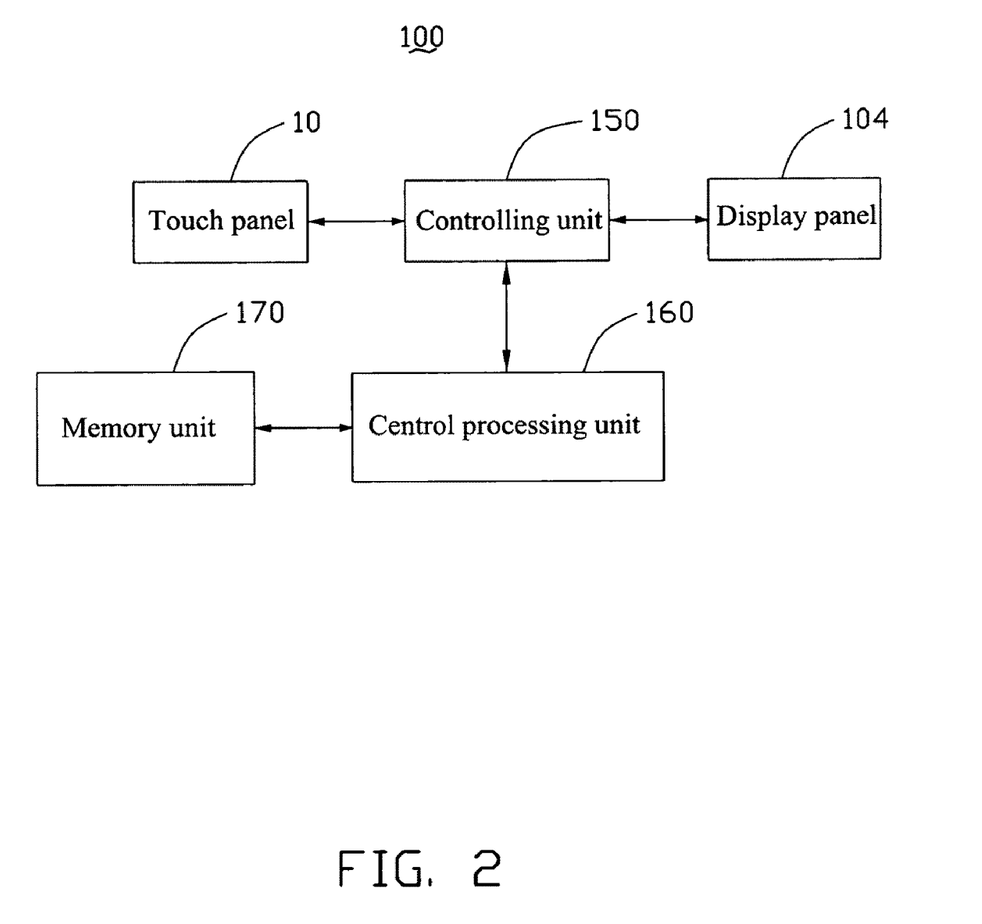
FIG. 2 is a block diagram of the mobile phone of FIG. 1.

Referring to FIGS. 1 and 2, first embodiment of a mobile phone 100 includes a body 102 and a touch panel 10. The body 102 defines a display panel 104. The touch panel 10 is disposed on the display panel 104.

The body 102 may further include a housing 190, a communicating system, a central processing unit (CPU) 160, a controlling unit 150, and a memory unit 170. The communicating system includes an antenna 192, a microphone 194, and a speaker 196. The CPU 160, the controlling unit 150, the memory unit 170, the microphone 194, the speaker 196, and the display panel 104 are received in the housing 190. The antenna 192 may be received in the housing 190 or extend out of the surface of the housing 190. The CPU 160, the controlling unit 150, and the memory unit 170 may be mounted on an integrated circuit board. The memory unit 170 and the controlling unit 150 are electrically connected to the CPU 160 via wires of the integrated circuit board. The speaker 196, the microphone 194, the antenna 192, the display panel 104, and the touch panel 10 are electrically connected to the controlling unit 150. The controlling unit 150 includes a touch-panel controller, a display controller, and a communicating controller. These controllers are used for controlling the touch panel 10, the display panel 104, the speaker 196, the microphone 194, and the antenna 192. The memory unit 170 includes a random access memory and a read only memory and is configured to store instructions that can be dealt with and executed by the CPU 160, and signals which are displayed via the display panel 104. The antenna 192 receives and sends radio frequency signals. The radio frequency signals are transported to a processor and transformed into audio signals. Accordingly, the speaker 196 works under the control of the controlling unit 150. The microphone 194 receives sounds and transforms the sounds into audio signals. Then, the audio signals are transported to the CPU 160 and transformed into radio frequency signals and sent out via the antenna 192 under the control of the controlling unit 150.

The display panel 104 may be a liquid crystal display panel, a field emission display panel, a plasma display panel, an electroluminescent display panel, or a vacuum fluorescent display panel. The display panel 104 is used for displaying dates or views from the body 102. In the present embodiment, the display panel 104 is a liquid crystal display panel.

The touch panel 10 may be spaced apart from the display panel 104 or integrated with the display panel 104. When the touch panel 10 is integrated with the display panel 104, it may be directly adhered onto a surface of the display panel 104 via paste or share a common substrate with the display panel 104 (that is to say, the second substrate 140 of the touch panel 10 functions as an emission plate of the display panel 104). Users can input instructions for the body 102 via touching or pressing the touch panel 10 by using an input device, such as keyboard, pen, or finger.

Figure 3:
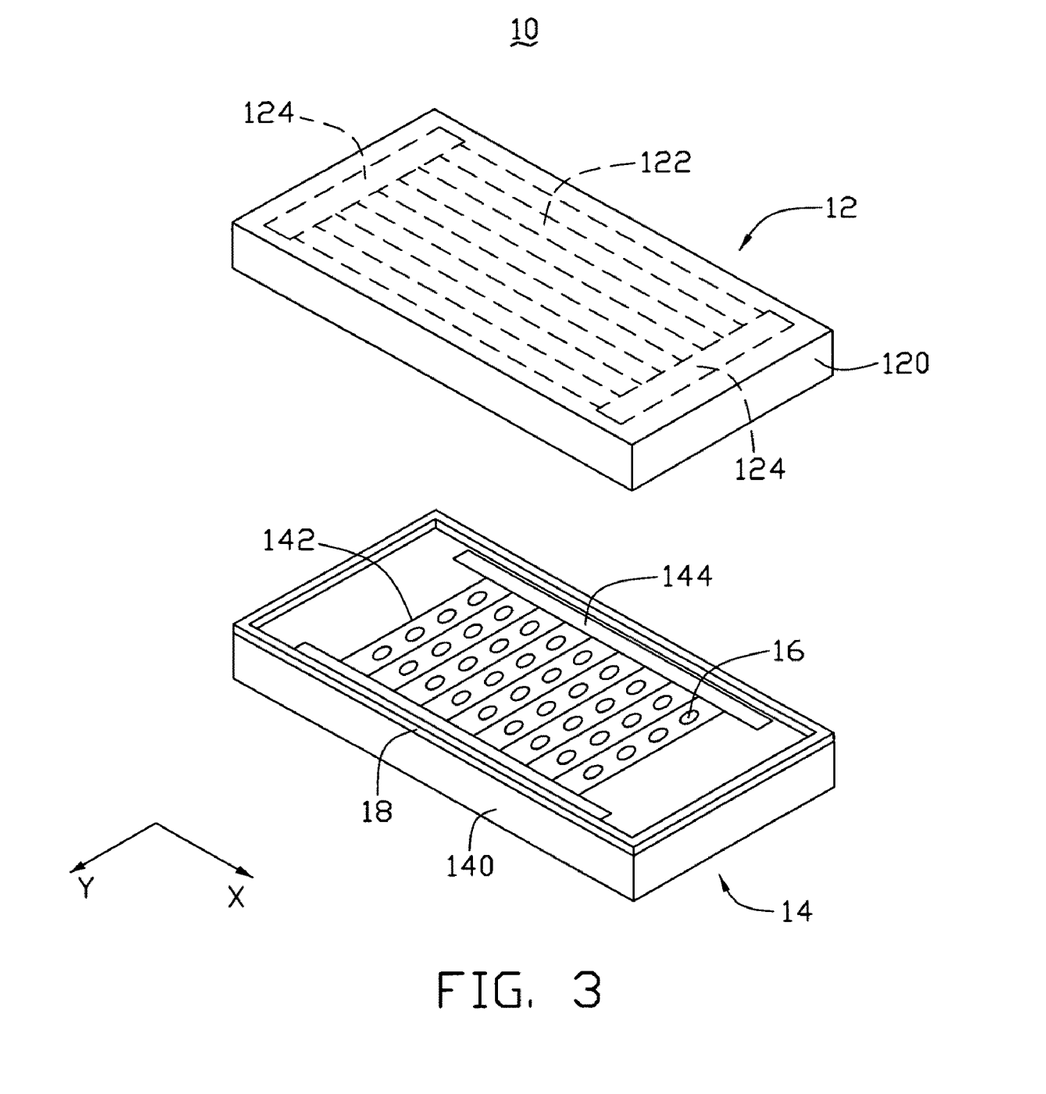
FIG. 3 is an isometric, partially exploded view of the resistive touch panel of FIG. 1.
Figure 4:
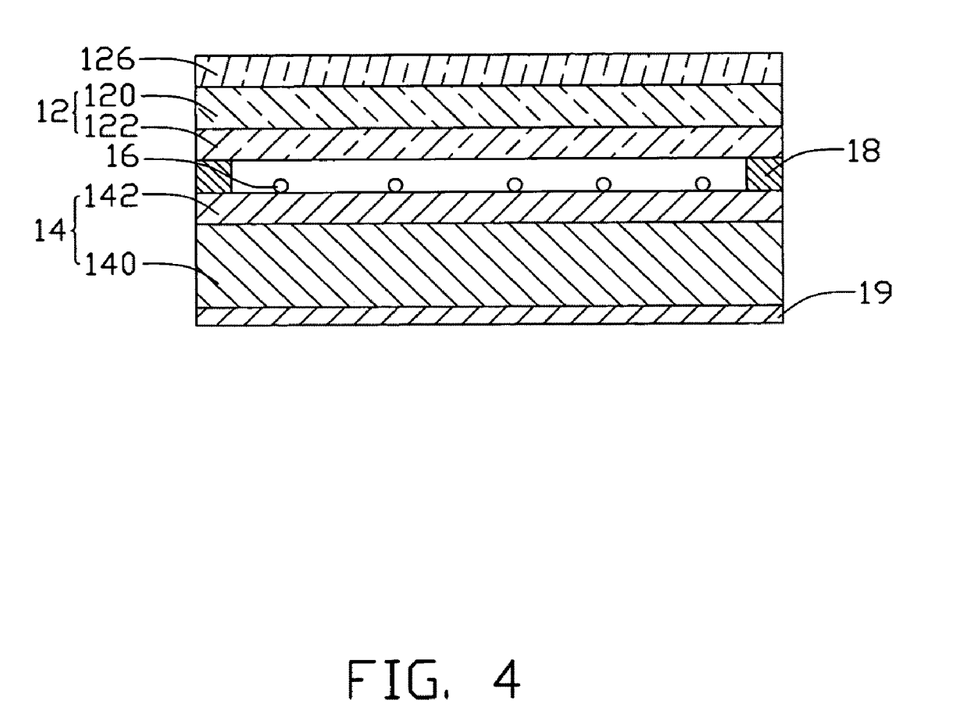
FIG. 4 is a schematic, cross-sectional view of the resistive touch panel of FIG. 1.

Referring to FIG. 3 and FIG. 4, the touch panel 10 is a resistive touch panel and includes a first electrode plate 12, a second electrode plate 14, and a plurality of transparent dot spacers 16. The second electrode plate 14 is directly adhered to the display panel 104.

The first electrode plate 12 includes a first substrate 120, a first conductive layer 122, and two first electrodes 124. The first substrate 120 has a planar structure, and includes a first surface. The first conductive layer 122 and the two first electrodes 124 are mounted on the first surface of the first substrate 120. The two first electrodes 124 are respectively disposed on the two ends of the first substrate 120 along a first direction and electrically connected to the first conductive layer 122. In the present embodiment, the first direction is marked as the X-direction. The second electrode plate 14 includes a second substrate 140, a second conductive layer 142 and two electrodes 144. The second substrate 140 has a planar structure, and includes a second surface. The second surface of the second substrate 140 is faced to the first surface of the first substrate 120. The second conductive layer 142 and the two electrodes 144 are disposed on the second surface of the second substrate 140. The two electrodes 144 are respectively disposed on the two ends of the second ends of the second substrate 140 along a second direction and electrically connected to the second conductive layer 142. The second direction is marked as the Y direction. The X direction is substantially perpendicular to the Y direction, namely, the two first electrodes 124 are substantially orthogonal to the two second electrodes 144.

The first substrate 120 can be a transparent and flexible film or plate made of polymer, resin, or any other suitable flexible material. The second substrate 140 can be a rigid and transparent board made of glass, diamond, quartz, plastic or any other suitable material, or can be a transparent flexible film or plate similar to the first substrate 120, if the touch panel 10 is flexible. A material of the flexible film or plate can be one or more of polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, and acrylic resins. The thickness of the first substrate 120 and the second substrate 140 can be in the range from about 5 millimeters to about 1 centimeter.

Furthermore, an insulating pad 18 is disposed on the periphery of the second surface of the second electrode plate 14. The first electrode plate 12 is disposed on the insulating pad 18. The first conductive layer 122 of the first electrode plate 12 is faced to the second conductive layer 142 of the second electrode plate 14. The plurality of transparent dot spacer 16 are spaced apart from one another and disposed on the second conductive layer 142 of the second electrode plate 14. A distance between the first and second electrode plates 12, 14 is in a range of about 2 mm to about 100 mm. The insulating pad 18 and the dot spacers 16 are made of transparent resin or the like and are used for insulating the first electrode plate 12 with the second electrode plate 14. Understandably, if the resistive touch panel 10 is small enough, the dot spacers 16 may be omitted.

A transparent protective film 126 may be disposed on the top surface of the first electrode plate 12. The transparent protective film 126 may be directly adhered on the first electrode plate 12 via paste, or combined with the first electrode plate 12 via a heat-press method. The transparent protective film 126 may be a plastic layer or a resin layer, which are treated via surface rigid treating. The resin layer may be made of benzo cyclo butene, polymethyl methacrylate, polymer resin, polyethylene terephthalate, or the like. In the present embodiment, the transparent protective film 126 is made of polyethylene terephthalate, and configured for protecting the first electrode plate 12 by improving wearability thereof. The transparent protective film 126 may provide some additional function, such as decreasing glare and reflection.

At least one of the first and second conductive layers 122, 142 includes a carbon nanotube layer. The carbon nanotube layer includes one or more carbon nanotube films. The carbon nanotube film is formed by a plurality of carbon nanotubes, ordered or otherwise, and has a uniform thickness. The carbon nanotube film can be an ordered film or a disordered film. The ordered carbon nanotube film consists of ordered carbon nanotubes. Ordered carbon nanotube films include films where the carbon nanotubes are arranged along a primary direction. Examples include films where the carbon nanotubes are arranged approximately along a same direction or have two or more sections within each of which the carbon nanotubes are arranged approximately along a same direction (different sections can have different directions). In the ordered carbon nanotube film, the carbon nanotubes can be primarily oriented along a same direction. However, the ordered carbon nanotube film can also have sections of carbon nanotubes aligned in a common direction. The ordered carbon nanotube film can have two or more sections, and the sections can have different alignments. The ordered carbon nanotube film may have a free-standing structure. The free-standing carbon nanotube film may include two types. One type is that the carbon nanotube film needs no substrate to support the carbon nanotubes thereof. Another type is that the carbon nanotube film only needs one or more supporting dots (not shown) to support one or more points thereof. Thus, left parts of the carbon nanotube film are hung. In the ordered carbon nanotube films, the carbon nanotubes are oriented along a same preferred orientation and approximately parallel to each other. The term "approximately" as used herein means that it is impossible and unnecessary that each of carbon nanotubes in the carbon nanotube films be exactly parallel to one another, namely that every carbon nanotubes is parallel to each other, because in the course of fabricating the carbon nanotube film, some factor, such as the change of drawing speed, affects the non-uniform drawing force on the carbon nanotube film as the carbon nanotube film is drawn from a carbon nanotube array. A film can be drawn from a carbon nanotube array, to form the ordered carbon nanotube film, namely a drawn carbon nanotube film. Examples of drawn carbon nanotube film are taught by US 20080170982 to Zhang et al. The drawn carbon nanotube film includes a plurality of successive and oriented carbon nanotubes joined end-to-end by van der Waals attractive force therebetween. The drawn carbon nanotube film is a free-standing film. The carbon nanotube film can be treated with an organic solvent to increase the mechanical strength and toughness of the carbon nanotube film and reduce the coefficient of friction of the carbon nanotube film. A thickness of the carbon nanotube film can range from about 0.5 nanometers to about 100 micrometers.

The disordered carbon nanotube film consists of disordered carbon nanotubes. Disordered carbon nanotube films include randomly aligned carbon nanotubes. When the disordered carbon nanotube film has a number of the carbon nanotubes aligned in every direction that are substantially equal, the disordered carbon nanotube film can be isotropic. The disordered carbon nanotubes can be entangled with each other and/or are approximately parallel to a surface of the disordered carbon nanotube film. The disordered carbon nanotube film may be a flocculated carbon nanotube film. The flocculated carbon nanotube film can include a plurality of long, curved, disordered carbon nanotubes entangled with each other. Furthermore, the carbon nanotubes in the flocculated carbon nanotube film can be isotropic. The carbon nanotubes can be substantially uniformly dispersed in the carbon nanotube film. Adjacent carbon nanotubes are attracted by van der Waals attractive force to form an entangled structure with micropores defined therein. It is understood that the flocculated carbon nanotube film is very porous. Sizes of the micropores can be less than 10 micrometers. The porous nature of the flocculated carbon nanotube film will increase specific surface area of the carbon nanotube structure. Furthermore, due to the carbon nanotubes in the flocculated carbon nanotube film being entangled with each other, the touch panel 10 employing the flocculated carbon nanotube film has excellent durability, and can be fashioned into desired shapes with a low risk to the integrity of the flocculated carbon nanotube film. The thickness of the flocculated carbon nanotube film can range from about 0.5 nanometers to about 1 millimeter.

The pressed carbon nanotube film can be a free-standing carbon nanotube film. The carbon nanotubes in the pressed carbon nanotube film may be arranged along a same direction or arranged along different directions. When the carbon nanotubes in the pressed carbon nanotube film are arranged along a same direction, the pressed carbon nanotube film is a ordered carbon nanotube film. When the carbon nanotubes in the pressed carbon nanotube film are arranged along different directions, the pressed carbon nanotube film is a disordered carbon nanotube film. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is approximately 0 degrees to approximately 15 degrees. The greater the pressure applied, the smaller the angle formed. When the carbon nanotubes in the pressed carbon nanotube film are arranged along different directions, the pressed carbon nanotube film can be isotropic. The thickness of the pressed carbon nanotube film ranges from about 0.5 nm to about 1 mm. Examples of pressed carbon nanotube film are taught by US application 20080299031A1 to Liu et al.

A length and a width of the carbon nanotube film can be arbitrarily set as desired. A thickness of the carbon nanotube film is in a range from about 0.5 nanometers to about 100 micrometers. The carbon nanotubes in the carbon nanotube film can be selected from the group consisting of single-walled, double-walled, multi-walled carbon nanotubes, and combinations thereof. Diameters of the single-walled carbon nanotubes, the double-walled carbon nanotubes, and the multi-walled carbon nanotubes can, respectively, be in the approximate range from about 0.5 nanometers to about 50 nanometers, about 1 nanometer to about 50 nanometers, and about 1.5 nanometers to about 50 nanometers.

Figure 5:
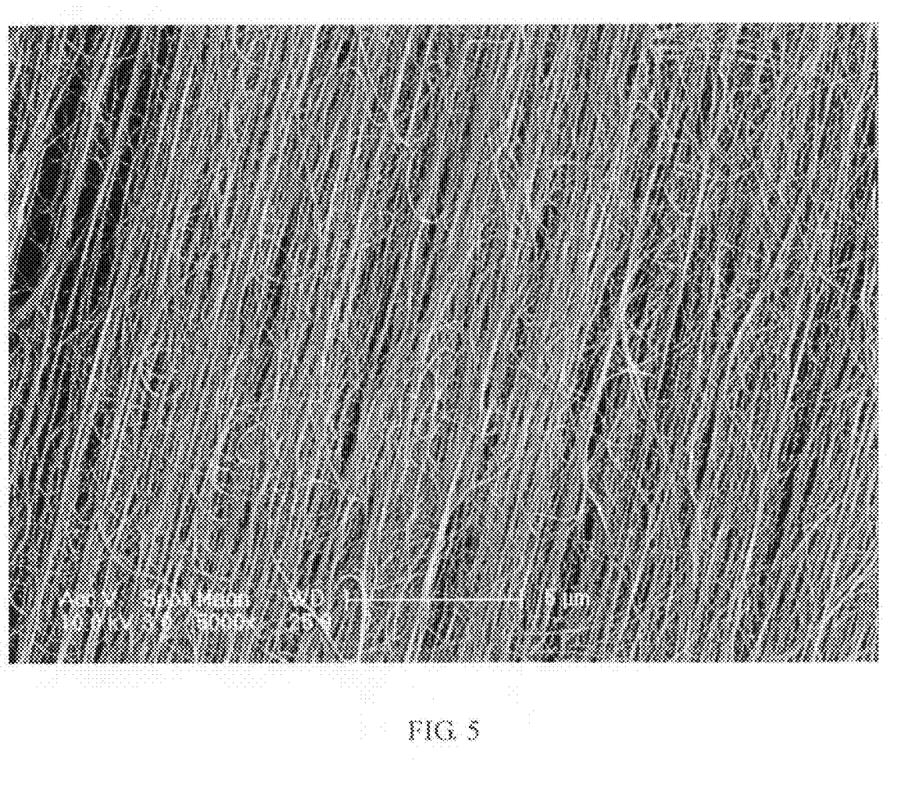
FIG. 5 is a scanning electron microscope image of the orderly carbon nanotube films used in the resistive touch panel of FIG. 1.

Referring to FIG. 5, in the present embodiment, the first conductive layer 122 and the second conductive layer 124 each include a carbon nanotube layer. The carbon nanotube layer is an ordered carbon nanotube film. The carbon nanotube layer may include a number of carbon nanotube films stacked with each other. The carbon nanotubes of each of the carbon nanotube films are arranged alone a preferred orientation. The carbon nanotube film includes a number of carbon nanotube segments joined end by end via van der Waals attractive forces. The carbon nanotube segments have a substantially same length and composed of a number of approximately parallel arranged carbon nanotubes. In the present embodiment, the carbon nanotube films of the first conductive layer 122 are overlapped alone the first direction, and the carbon nanotube films of the second conductive layer 124 are overlapped along the second direction. The carbon nanotube films have thickness of about 0.5 nm to 100 mm and width of 0.01 cm to about 10 cm.

The mobile phone 100 may further include a shielding layer 19 disposed on the bottom surface of the touch panel 10. The material of the shielding layer 19 can be a conductive resin film, a carbon nanotube film, or another kind of flexible and conductive film. In the present embodiment, the shielding layer 19 is a carbon nanotube film. The carbon nanotube film includes a plurality of carbon nanotubes, and the orientation of the carbon nanotubes therein can be arbitrarily determined. Understandably, the carbon nanotubes in the carbon nanotube film of the shielding layer 19 can be arranged along a same direction. The carbon nanotube film is connected to ground and acts as shielding, thus enabling the touch panel 10 to operate without interference (e.g., electromagnetic interference).

The mobile phone 100 may further include a passivation layer 13 interposed between the display panel 104 and the touch panel 10. The passivation layer 13 is used for preventing crosstalk, electrochemical corrosion, and so on, or reducing power consumption. The passivation layer 13 may be made of silicon nitrogen, silicon oxide, or the like.

Figure 6:
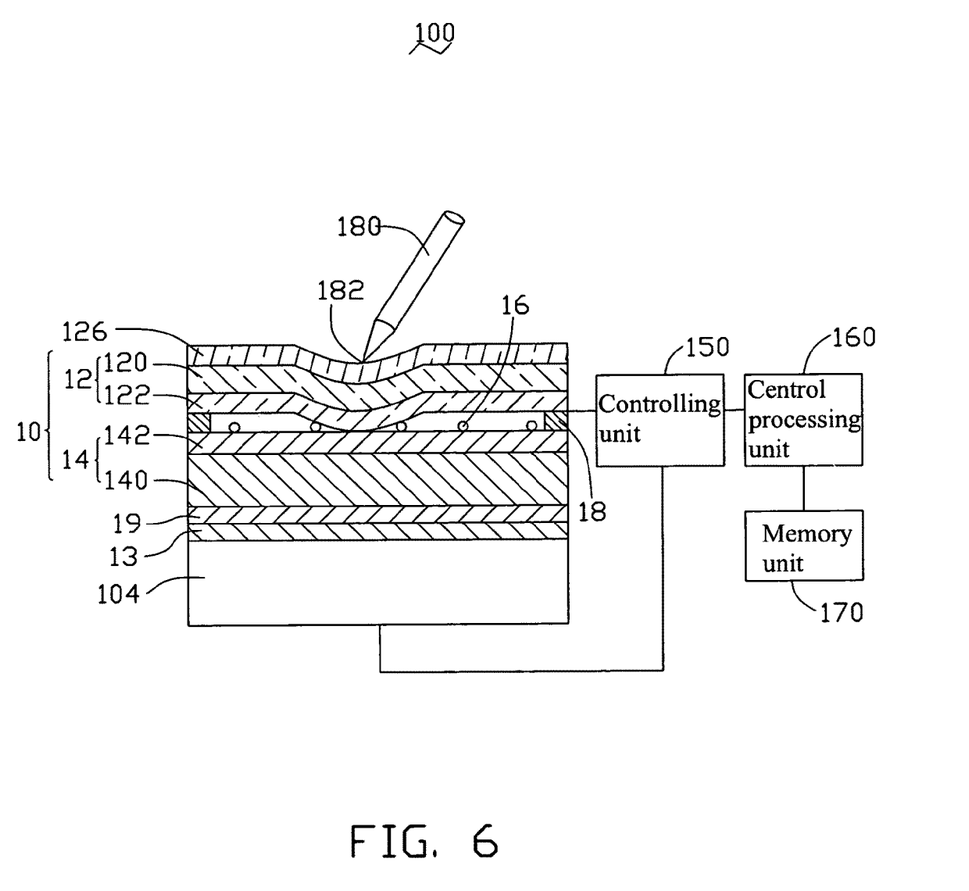
FIG. 6 is a schematic view of the resistive touch panel of FIG. 1 when in use.

Referring to FIG. 6, in operation, a voltage of about 5 volts, for example, is applied to the first and second electrodes 124, 144. Equipotential lines parallel to the first and second electrodes are formed in the first and second transparent conductive layers 122, 142. A user operates the mobile phone 100 by pressing or touching the touch panel 10 with a touch tool 180, such as a finger, or a pen/stylus, while visually observing the display panel 104 through the touch panel 10. An input position 182 can be determined from X-Y coordinates based on the X Y directions and corresponding to the potential of the input position 182 developed from the press or touch of the touch panel 10. With the first and second conductive layers 122, 142 set so that the equipotential lines intersect at right angles, and alternatively switching transistors with a period of several milliseconds, the coordinates of the input position 182 are detected. The controlling unit 150 detects coordinates of the touch point on the touch panel 10 according to change of currents of the first and second electrodes 124,144. Then the touch panel 10 sends the coordinates of the touch point to the CPU 160. The CPU 160 reads an instruction, according to the coordinates of the touch point, in the memory unit 170, and sends the instruction to the controlling unit 150. The controlling unit 150 controls the display panel 104, the antenna 192, the microphone 194, and the speaker 196 to operate according to the instruction.

Figure 7:
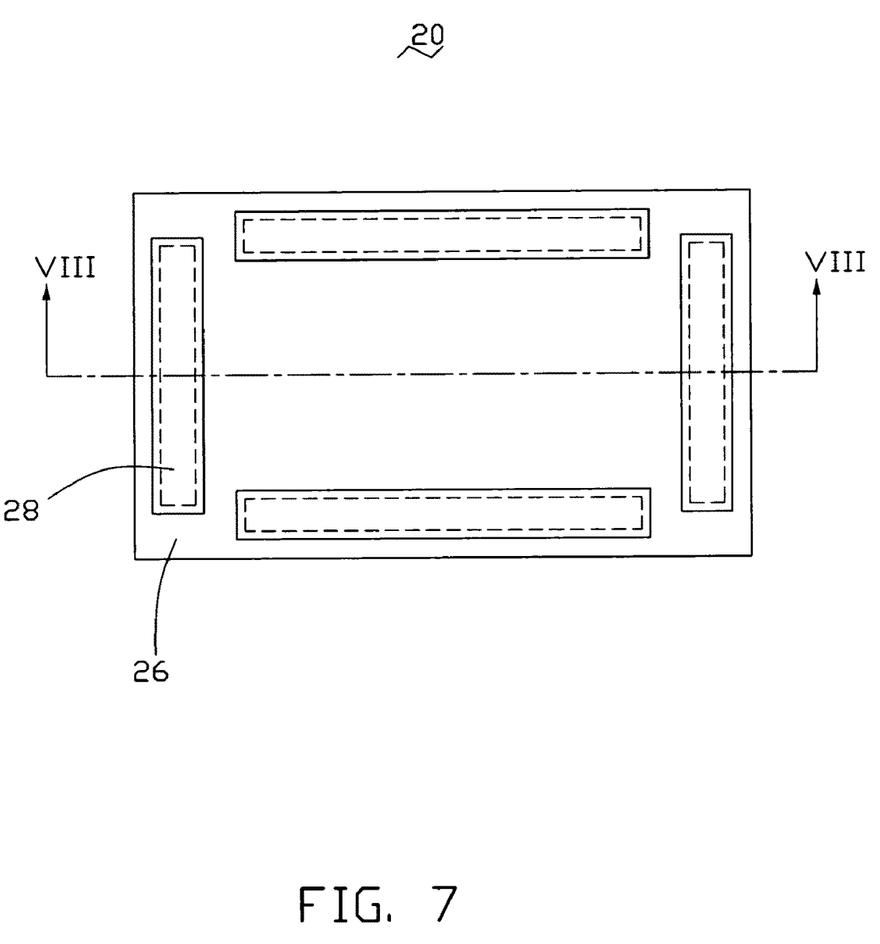
FIG. 7 is a top-view of one embodiment of a capacitive touch panel of a second embodiment of a mobile phone.
Figure 9:
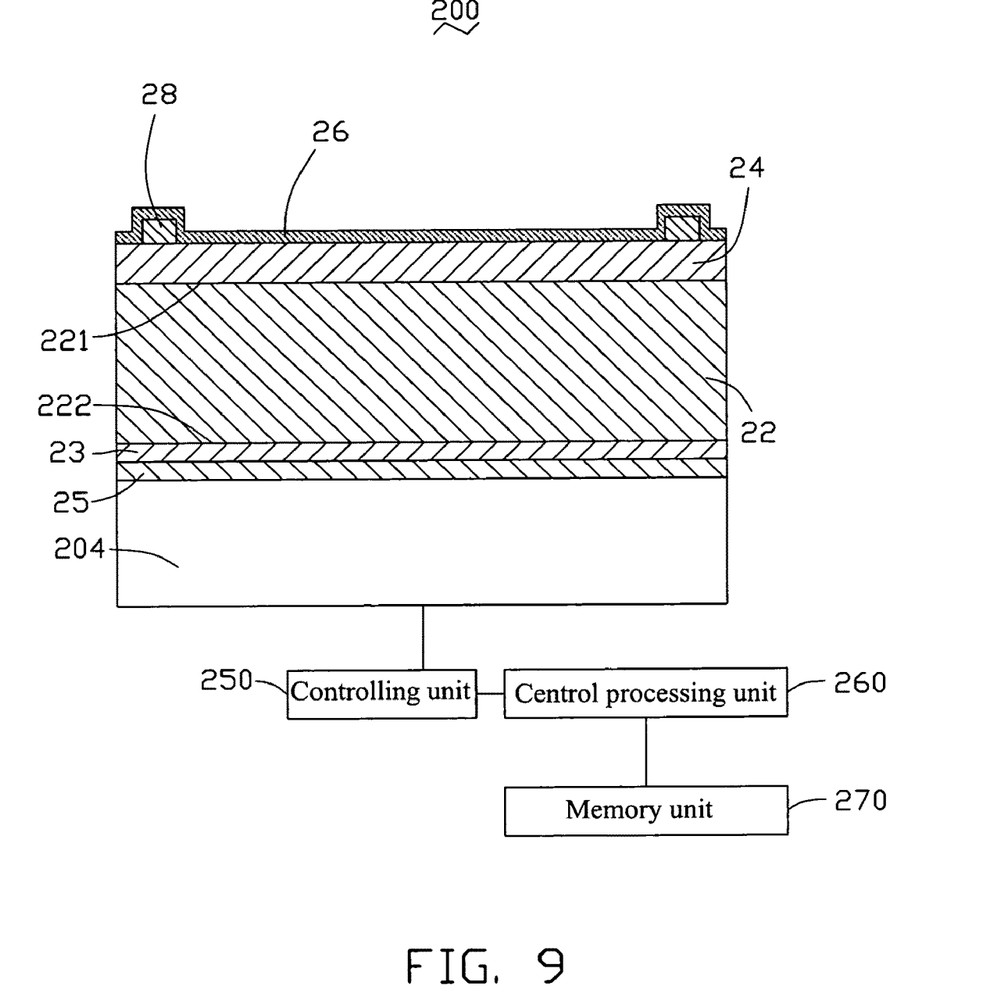
FIG. 9 is a schematic, cross-sectional view of the capacitive touch panel of FIG. 7 when in use.

Referring to FIG. 7 and FIG. 9, a second embodiment of a mobile phone 200 includes a body (not shown) and a touch panel 20. The body defines a display panel 204 thereon. The touch panel 20 is disposed on the touch panel far away from the body.

Figure 8:
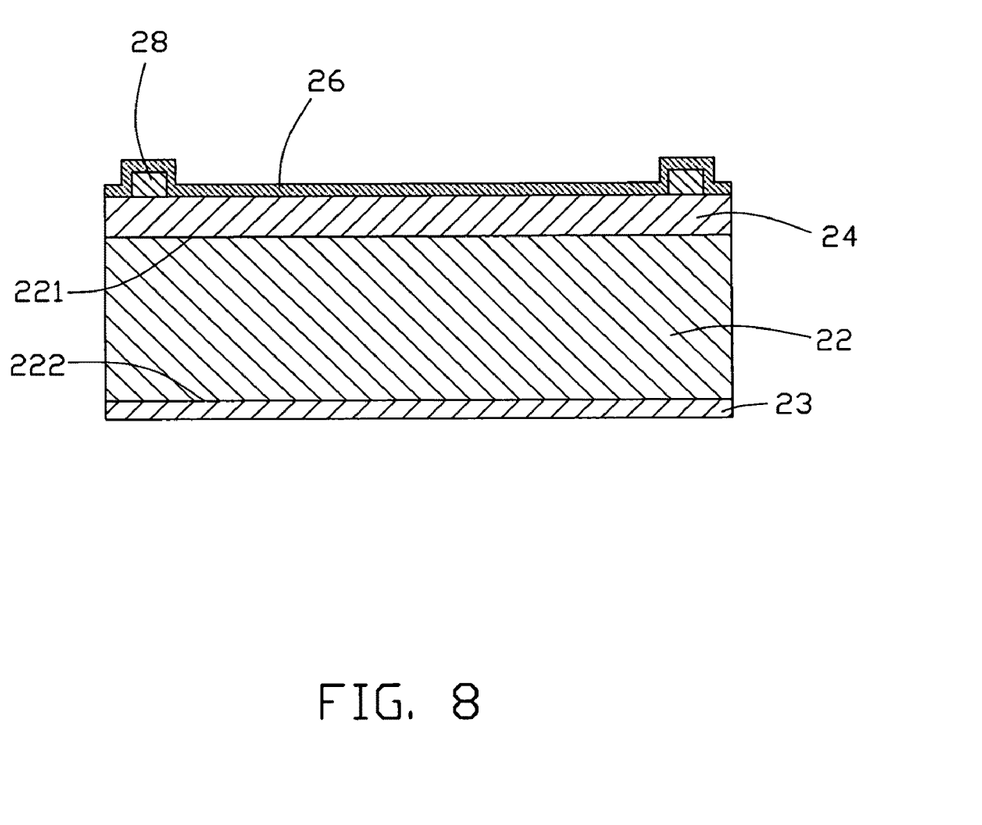
FIG. 8 is a schematic, cross-sectional view of the capacitive touch panel of FIG. 7, taken alone line VII-VII.

The touch panel 20 is a capacitive touch panel. The touch panel 20 includes a substrate 22, a transparent conductive layer 24, at least two electrodes 28, and a transparent protective film 26. The substrate 22 is adjacent to the display panel 204. It is appreciated that the substrate 22 may function as the top substrate of the display panel 204, namely, the touch panel 20 shares a common substrate with the display panel 204. The substrate 22 includes a first surface 221 and a second surface 222 opposite to the first surface 221. The first surface 221 is far away from the display panel 204. The transparent conductive layer 24 is mounted on the first surface 221 of the substrate 22. At least two electrodes 28 are disposed at the periphery of the transparent conductive layer 24, spaced from each other, and electrically connected to the transparent conductive layer 24 to form equipotential lines thereon. The transparent protective layer 26 can be directly disposed on the transparent conductive layer 24 and the electrodes 28.

In the present embodiment, the touch panel 20 has four electrodes 28 respectively disposed on the four sides of the transparent conductive layer 24. Understandably, the four electrodes 28 can be disposed on the different surfaces of the transparent conductive layer 24 as long as equipotential lines can be formed on the transparent conductive layer 24.

Understandably, the four electrodes 28 can be disposed between the transparent conductive layer 24 and the substrate 22 and electrically connected to the transparent conductive layer 24.

The substrate 22 has a curved structure or a planar structure and functions as a supporter for the touch panel 20. The supporter is sandwiched between the touch panel 20 and the display panel 204. The substrate 22 is made of a rigid material or a flexible material, such as glass, silicon, diamond, plastic, or the like.

The transparent conductive layer 24 includes a carbon nanotube layer. The carbon nanotube layer includes a number of uniformly arranged carbon nanotubes, and the carbon nanotubes are orderly, or disorderly arranged. In the present embodiment, the carbon nanotube layer of the transparent conductive layer 24 has the same configuration as the first and second conductive layer 122, 124 of the first embodiment of the mobile phone 100.

The four electrodes 28 are made of metal, a carbon nanotube thin film, or the like. In the present embodiment, the four electrodes 28 are layers of silver, copper, or foils of metal and have strip-shaped structures.

In order to prolong the life of the transparent conductive layer 24 and limit capacitance between the touch point and the transparent conductive layer 24, a transparent protective film 26 is disposed on the transparent conductive layer 24 and the electrodes 28. The transparent protective film 26 is made of polyethylene terephthalate, silicon nitrogen, silicon oxide or the like, and configured for protecting the transparent conductive layer 24 by improving wearability thereof. The transparent protective film 26 may provide some additional function, such as decreasing glare and reflection after special treating.

In the present embodiment, the transparent protective film 26, which is made of silicon dioxide, is disposed on the transparent conductive layer 24 on which the electrodes 28 is mounted. The transparent protective film 26 has a hardness of 7H (H established according to Rockwell hardness test). Understandably, the hardness and the thickness of the transparent protective film 26 may be varied in practice as desired. The transparent protective film 26 is directly adhered on the transparent conductive layer 24 via paste.

The mobile phone 200 further includes a shielding layer 23 disposed on the second surface 222 of the touch panel 10 when the touch panel 20 is integrated with the display panel 204. The material of the shielding layer 23 can be a conductive resin film, indium tin oxide, antimony doped tin oxide, a carbon nanotube film, or another kind of flexible and conductive film. In the present embodiment, the shielding layer 23 is a carbon nanotube film. The carbon nanotube film includes a plurality of carbon nanotubes, and the orientation of the carbon nanotubes therein can be arbitrarily determined. Understandably, the carbon nanotubes in the carbon nanotube film of the shielding layer can be arranged along a same direction. The carbon nanotube film is connected to ground and acts as shielding, thus enabling the touch panel 20 to operate without interference (e.g., electromagnetic interference).

The mobile phone 200 further include a passivation layer 25 interposed between the display panel 204 and the touch panel 20. The passivation layer 25 is used for preventing crosstalk, electrochemical corrosion, and so on, or reducing power consumption. The passivation layer 25 may be made of silicon nitrogen, silicon oxide, or the like.

In use, when a user operates the mobile phone 200 by pressing or touching the touch panel 20 with a touch tool (not shown), such as a finger, or a pen/stylus, the capacitance at the touch point changes, which results in a change in frequency of an oscillator (not shown). By alternatively switching the oscillator within a period of several milliseconds, the coordinates of the input point are detected. The controlling unit 250 calculates the proportion of the four supplied currents of the four transparent electrodes 28, thereby detecting coordinates of the touch point on the touch panel 20. Then the controlling unit 250 sends the coordinates of the touch point to the CPU 260. The CPU 260 reads an instruction according to the coordinates of the touch point in the memory unit 270 and sends the instruction to the controlling unit 250. The controlling unit 250 controls the display panel 204, the antenna, the microphone, and the speaker to operate according to the instruction.

As described above, the carbon nanotube films employed in the touch panel has superior properties, such as excellent toughness, high mechanical strength, and uniform conductivity. Thus, the touch panel and the mobile phone using the same are durable and highly conductive. Each of the carbon nanotube films includes a number of successively oriented carbon nanotubes joined end to end by the van der Waals attractive force therebetween. As such, the carbon nanotube films are flexible, and suitable for using as the conductive layer in a flexible touch panel. Furthermore, the carbon nanotube films have high transparency, thereby promoting improved brightness of the touch panel and the mobile phone using the same. Additionally, since the carbon nanotubes have excellent electrical conductivity properties, the carbon nanotube films have a uniform resistance distribution. Thus, the touch panel and the mobile phone adopting the carbon nanotube films have improved sensitivity and accuracy.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A mobile phone, comprising:
   a body having a display panel, the body further comprising a communicating system disposed therein;
   a touch panel disposed on a surface of the display panel, the touch panel comprising at least one transparent conductive layer, the at least one transparent conductive layer comprising a carbon nanotube layer;
   wherein the touch panel comprises a resistive touch panel, the resistive touch panel comprises a first electrode plate and a second electrode plate connected to the first electrode plate,
      the first electrode plate comprises:
         a first substrate defining a first surface,
         a first transparent conductive layer mounted on the first surface of the first substrate, and
         two first electrodes, the two first transparent electrodes are fixed on two ends of the first transparent conductive layer in a interval along a first direction; the first transparent conductive layer comprises a carbon nanotube layer, the carbon nanotube layer comprises a plurality of carbon nanotubes arranged along a first direction;
      the second electrode plate comprises:
         a second substrate defining a second surface away from the display panel,
         a second transparent conductive layer mounted on the second surface of the second transparent substrate, and
         two second transparent electrodes, the two second transparent electrodes are fixed on the two ends of the first transparent conductive layer, the second conductive layer and the two second transparent electrodes of the second electrode plate face the first electrode plate,
         the second transparent conductive layer comprises a carbon nanotube layer, the carbon nanotube layer comprises a plurality of carbon nanotubes arranged along a second direction, the second direction is substantially perpendicular to the first direction.

2. The mobile phone as claimed in claim 1, further comprising a passivation layer interposed between the display panel and the touch panel.

3. The mobile phone as claimed in claim 1, wherein the carbon nanotube layer comprises at least one layer of carbon nanotube film, the carbon nanotube film comprises a plurality of carbon nanotubes.

4. The mobile phone as claimed in claim 1, wherein the carbon nanotube film is a drawn carbon nanotube film.

5. The mobile phone as claimed in claim 3, wherein the carbon nanotubes of the at least one layer of carbon nanotube film are connected end to end by van der Waals forces therebetween and are approximately parallel with each other.

6. The mobile phone as claimed in claim 3, wherein the carbon nanotubes are selected from the group consisting of single walled carbon nanotubes, double walled carbon nanotubes, and multi-walled carbon nanotubes.

7. The mobile phone as claimed in claim 1, wherein the carbon nanotube layer comprises at least one layer of carbon nanotube film, the carbon nanotube film comprises a plurality of carbon nanotubes, the carbon nanotubes are entangled with one another.

8. The mobile phone as claimed in claim 1, further comprising a shield layer interposed between the touch panel and the display panel.

9. The mobile phone as claimed in claim 1, further comprising a protective layer disposed on a surface of the touch panel away from the display panel.

10. The mobile phone as claimed in claim 1, wherein the resistive touch panel comprises an insulated pad interposed between the peripheries of the first and second electrode plates and configured for spacing from therebetween.

11. The mobile phone as claimed in claim 1, wherein the two first and second transparent electrodes are fixed on the opposite ends of the first and second transparent conductive layer respectively.

12. The mobile phone as claimed in claim 1, wherein the resistive touch panel comprises a plurality of transparent dot spacers sandwiched between the first and second electrode plates to space the first electrode plate from the second electrode plate.

13. The mobile phone as claimed in claim 1, wherein a longitudinal axis of the carbon nanotubes of the second transparent conductive layer is substantially perpendicular to that of the carbon nanotube of the first transparent conductive layer when the carbon nanotube films of the first and second transparent conductive layer are orderly formed by the carbon nanotubes.

14. The mobile phone as claimed in claim 1, wherein at least one transparent conductive layer is a carbon nanotube film.

15. The mobile phone as claimed in claim 14, wherein the carbon nanotube film is one of a drawn carbon nanotube film, a flocculated carbon nanotube film, and a pressed carbon nanotube film.

16. The mobile phone as claimed in claim 15, wherein the carbon nanotube film is a drawn carbon nanotube film, the carbon nanotubes in the drawn carbon nanotube film are oriented along a same preferred orientation and approximately parallel to each other.

17. The mobile phone as claimed in claim 15, wherein the carbon nanotube film is the flocculated carbon nanotube film, the flocculated carbon nanotube film is porous and isotropic, and the carbon nanotube of the flocculated carbon nanotube film are entangled with each other and uniformly dispersed in the flocculated carbon nanotube film; adjacent carbon nanotubes in the flocculated carbon nanotube film are attracted by van der Waals attractive force.

18. The mobile phone as claimed in claim 15, wherein the carbon nanotube film is a pressed carbon nanotube film, the carbon nanotubes in the pressed carbon nanotube film are arranged along a same direction or arranged along different directions and rest upon each other.

19. The mobile phone as claimed in claim 15, wherein the carbon nanotube film is a pressed carbon nanotube film, an angle between a primary alignment direction of the carbon nanotubes in the pressed carbon nanotube film and a surface of the pressed carbon nanotube film is approximately 0 degrees to approximately 15 degrees.

20. The mobile phone as claimed in claim 15, wherein the carbon nanotube film is a pressed carbon nanotube film, the pressed carbon nanotube film is isotropic if the carbon nanotubes in the pressed carbon nanotube film are arranged along different directions.

* * * * *